United States Patent [19]

Bean

[11] 3,852,134

[45] Dec. 3, 1974

[54] METHOD FOR FORMING SELECTIVELY PERFORATE BODIES

[75] Inventor: Charles P. Bean, Schenectady, N.Y.

[73] Assignee: General Electric Company, Schenectady, N.Y.

[22] Filed: Nov. 20, 1972

[21] Appl. No.: 308,158

Related U.S. Application Data

[63] Continuation of Ser. No. 821,703, May 5, 1969, abandoned.

[52] U.S. Cl............................ 156/8, 156/4, 156/16, 250/83, 252/79.2, 252/79.4, 252/79.5
[51] Int. Cl............................................... G01t 5/00
[58] Field of Search.............. 156/2, 7, 8, 11, 16, 4; 250/83, 83.1; 204/157.1

[56] References Cited
UNITED STATES PATENTS

| | | | |
|---|---|---|---|
| 3,335,278 | 8/1967 | Price et al............................ | 156/2 X |
| 3,612,871 | 10/1971 | Crawford............................. | 250/83 |

Primary Examiner—William A. Powell
Attorney, Agent, or Firm—Clarence T. Watts; Joseph T. Cohen; Jerome C. Squillaro

[57] ABSTRACT

This invention relates to a method of forming a selectively perforate membrane suitable for high resolution screen printing by homogeneously irradiating a sheet of synthetic resin, e.g., a polycarbonate resin, with heavy fission fragments whereupon the sheet is selectively irradiated in an oxygen atmosphere with electromagnetic radiation less than 4,000A (or a high intensity electron beam) to enhance the etch rate of those damage tracks lying within the electromagnetically irradiated area of the sheet. Apertures less than 200A in diameter then are etched through the sheet in areas of dual irradiation whereupon etching is abruptly terminated and the sheet is annealed at a temperature above 80°C to obliterate fission track damage. The selectively apertured sheet then is etched again to enlarge the apertures to a diameter between 1,000A and 100,000A.

3 Claims, 5 Drawing Figures

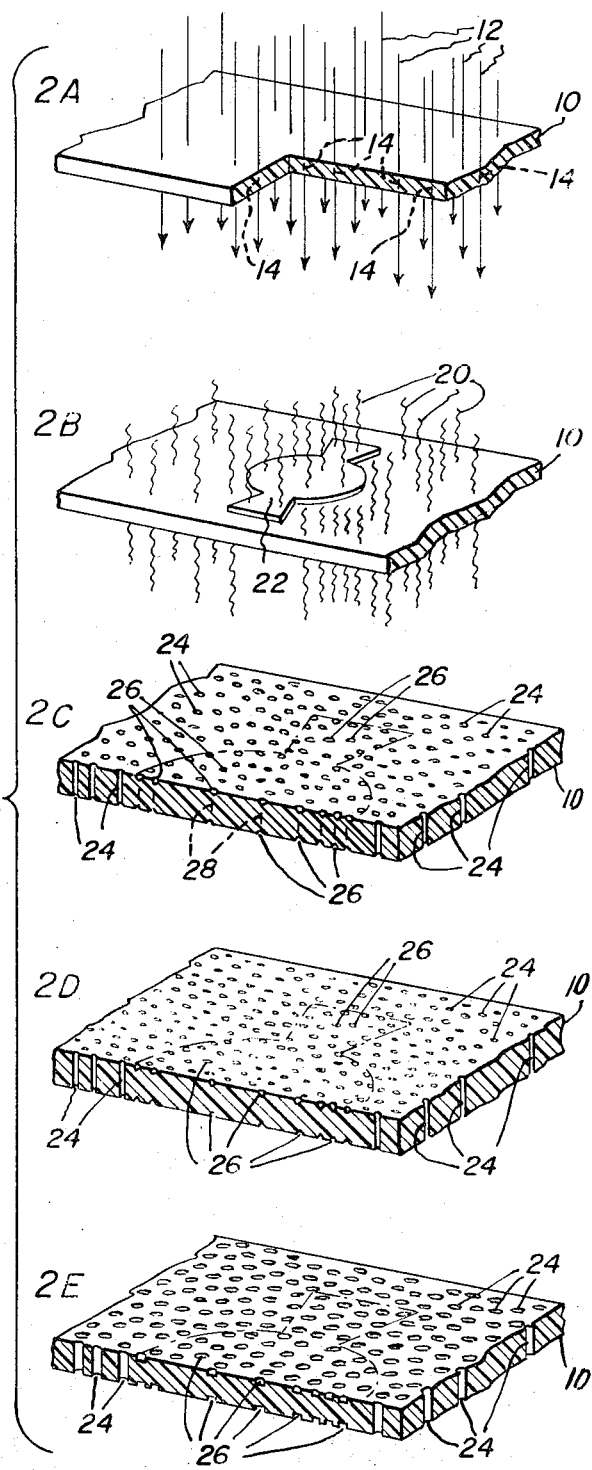

PATENTED DEC 3 1974 3,852,134
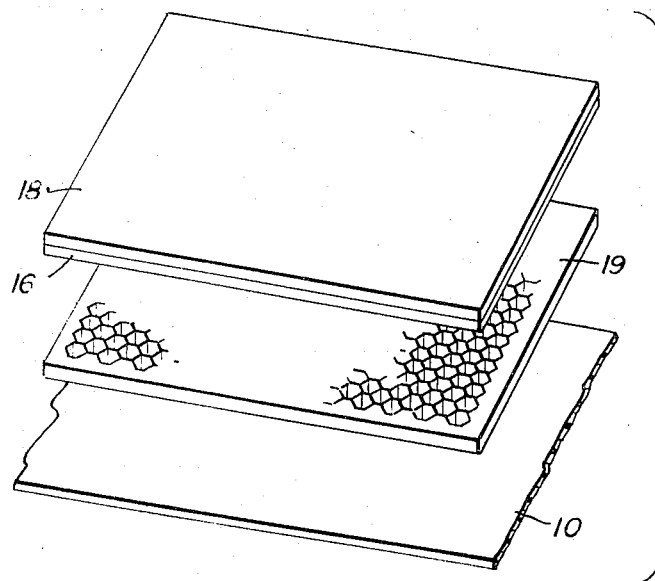
Fig. 3.
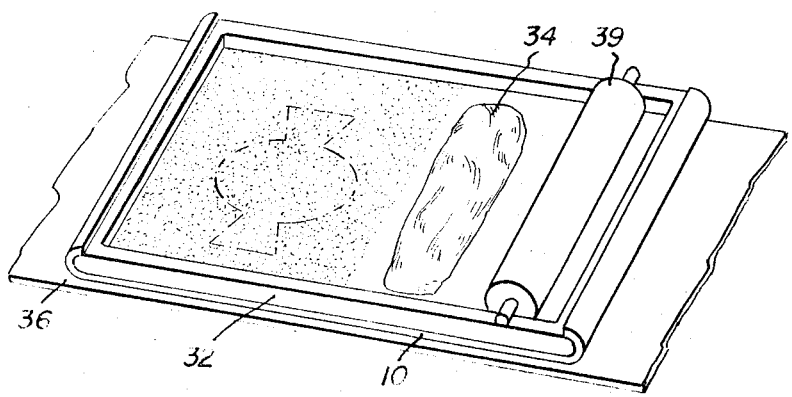
Fig. 4.
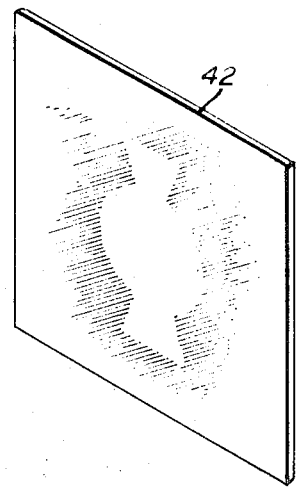
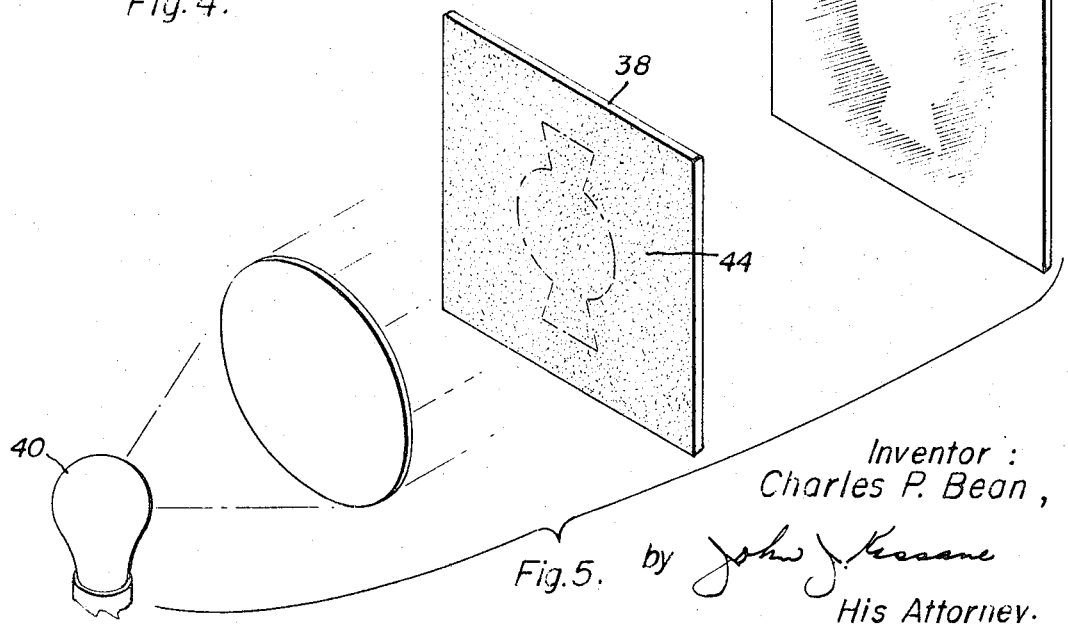
Fig. 5.
Inventor:
Charles P. Bean,
by John J. Kissane
His Attorney.

METHOD FOR FORMING SELECTIVELY PERFORATE BODIES

This a continuation of application Ser. No. 821,703, filed May 5, 1969, now abandoned.

This invention relates to a method of forming perforate bodies having high density, straight through apertures over a preselected area and, in particular, to the formation of selectively perforate bodies by the erasure of high solubility regions in a selectively etched body to permit enlargement of small diameter apertures in the body.

A multitude of straight through apertures in sheets of various materials, e.g., solids, such as mica; noncrystalline inorganic material, such as glass; and organic material, such as polymeric plastic; heretofore have been formed by homogeneously bombarding the sheet with a source of heavy energetic charge particles to produce damage tracks in a density between $10^4$ and $10^8$ per square centimeter running entirely through the sheet. The charge particle irradiated body then is immersed within a suitable etchant which preferentially attacks the damage tracks to produce apertures through the sheet as small as 100A in diameter. Continued etching of the sheet following the dissolution of the damage tracks has permitted enlargement of the apertures to a maximum dimension as large as 100,000A in diameter. Similarly, it is known that the rate of preferential attack of the etchant upon the damage tracks can be increased by uniformly irradiating the charge particle bombarded sheet with electromagnetic radiation below 4,000A (or with a high intensity electron beam) while the etch rate of damage tracks heretofore has been decreased by annealing the sheet to obliterate the presence of the damage tracks therein.

There are many utilizations however, such as silk screen printing or image reproduction, which require a high aperture density over a preselected area for high resolution reproduction purposes. Prior to this invention, the only known technique to produce a region of high density apertures less than 100,000A in diameter over a preselected area of a sheet has been to selectively shield the sheet during heavy energetic charged particle bombardment thereof. This technique however has not been effective in practice not only because highly dense shields are required to intercept the heavy energetic charged particles but also because positioning of the shield at selected locations along the sheet hinders continuous processing of the sheet by passage through an atomic reactor.

It is therefore an object of this invention to provide a method of forming a solid body having a preselected area of high density, straight through apertures.

It is also an object of this invention to provide a method of forming an apertured body in a predetermined design without a selective shielding of the body from heavy energetic charged particles.

These and other objects of this invention are achieved by subjecting a solid body to a homogeneous bombardment of charge particles having an energy level sufficient to form damage tracks extending through the body and selectively exposing a portion of the homogeneously bombarded body in an oxygen containing atmosphere to radiant energy for a period required to alter the solubility of the damage tracks. The body then is etched for a period sufficient to etch those damage tracks lying within the selectively irradiated area of the body whereupon etching is terminated and the selectively etched body is annealed to obliterate the altered solubility of the damage tracks remaining in the body. The body then is etched again to enlarge the pores formed in the body during the initial etch of the body. Preferably, the initial etch of the body is sufficiently long to completely etch through those damage tracks lying within the selectively irradiated area of the body while being insufficient in duration to completely etch through damage tracks lying outside the selectively irradiated area of the body.

The novel features believed characteristic of the invention are set forth in the appended claims. The invention itself, together with further objects and advantages thereof may best be understood by reference to the following description, taken in connection with the accompanying drawings, in which:

FIG. 1 is a flow chart depicting in block diagram form the method of this invention, FIG. 2 is a pictorial illustration of the formation of a selectively perforate sheet in accordance with this invention, FIG. 3 is an isometric illustration of suitable apparatus for the generation of heavy energetic charged particles, FIG. 4 is a simplified isometric view depicting the utilization of a selectively perforate sheet for screen printing, and FIG. 5 is a simplified isometric view illustrating one technique of image projection employing a selectively perforate sheet.

The method of this invention, as illustrated in FIGS. 1 and 2, initially comprises the homogeneous bombardment of a sheet 10 of suitable material, e.g., polycarbonate resin, with heavy energetic charge particles, identified by reference numeral 12, which particles pass straight through the sheet to produce fission damage tracks 14 therein as portrayed specifically in FIG. 2A. Desirably sheet 10 is less than 20 microns thick and generally is of elongated length to permit a continuous homogeneous irradiation of the entire sheet by a passage through a suitable source for the generation of charge particles, e.g., a nuclear reactor. In general, any synthetic resin, e.g., polyester resins such as polycarbonares and polyethylene terephthalate, as well as cellulostic materials such as cellulose nitrate, cellulose acetate, and mixtures thereof, are suitable for utilization as the sheet material in the practice of this invention although polycarbonate resin sheets are preferred because of the susceptibility of polycarbonate resins to fission track damage by heavy fission fragments and the accelerated etch rate of the fission tracks in polycarbonate resins relative to undamaged regions of the resin sheet.

A suitable source for homogeneously irradiating sheet 10 with charged particles is illustrated in FIG. 3 wherein a layer 16 of Californium-252 deposited on a substrate 18 serves to emit fission fragments which bombard sheet 10 and pass therethrough in a generally undeflected path. An aluminum homeycomb 19, typically having hexagon shaped cells one-eighth inch in diameter and nine-sixteenths inch long, is disposed intermediate the Californium-252 layer and sheet 10 to collimate the fission fragments along a desired trajectory, illustrated as being perpendicular relative to the plane of the sheet in FIG. 3. Preferably the charge particle bombardment of sheet 10 is conducted in vacuum to maximize the energy to the particles impinging upon the sheet while the period of exposure of sheet 10 to fission fragment bombardment generally is variable dependent upon the aperture density desired and the particle emission rate of the source employed for bombardment.

Suitable sources of charge material to produce damage tracks within sheet 10 not only include self-fissioning isotopes, such as Californium-252, but also isotopes which decay by the emission of alpha particles, such as radium-226 and Americum-241, as well as materials, such as Uranium-235, which fission and emit fission fragments when irradiated with neutrons. Similarly, materials such as boron-10 which emit alpha particles when irradiated with neutrons and various atomic and sub-atomic particle accelerators also can be employed for the production of damage tracks if desired. In general when the sheet to be irradiated is a cellulosic material, the damage track producing charge particles preferably are alpha particles while damage tracks in polycarbonate resins preferably are formed by relatively heavy fission fragments.

Following the homogeneous bombardment of sheet 10 with charge particles to form damage tracks therein, the sheet is selectively exposed in the presence of oxygen containing gases with radiant energy, e.g., ultraviolet radiation 20, to increase the preferential etch rate of damage tracks lying in the selectively exposed area. Although FIG. 2b portrays the masking of ultraviolet radiation by a metallic shield 22 positioned atop sheet 10 for clarity of illustration, in actual practice a suitable ultraviolet shield preferably is disposed proximate the ultraviolet radiation source to intercept selected rays thereby projecting an optical image upon the surface of sheet 10.

The period of selective irradiation of sheet 10 will depend upon the source employed therefor with a 15 minute irradiation by a General Electric Black Lamp, H-100, disposed 1 centimeter from the sheet generally being sufficiently long to alter the solubility rate of the damaged tracks by a factor in excess of approximately 10 to 1. Since the homogeneous bombardment of sheet 10 with the charge particles forms damage tracks 14 having an etch rate increased by a factor as high as 1,000 relative to the etch rate of undamaged portions of the sheet, tracks in those areas exposed to radiant energy etch at a rate as high as approximately 10,000 to 1 relative to undamaged sites in the sheet.

While ultraviolet energy is preferred as the radiant energy source for the selective exposure of sheet 10 because of the substantial increase in etch rate achieved therewith and the ready availability of ultraviolet energy sources at modest economic cost, any source of energy below 4,000A can be employed to increase the solubility of the damage tracks. Similarly, high energy electron bombardment of selective areas of the sheet surface using a high intensity electron gun, e.g., the gun described in an article entitled "The Fly's Eye Lens — A Novel Electron Optical Component For Use With Large Capacity Random Access Memories" by S. P. Newberry in Volume 29 of the American Federation of Information Processing Societies, Conference Proceedings, published Nov., 1966 by Spartan Books, Washington, D.C. also can be employed to increase the solubility of the damage tracks without significantly affecting the solubility of unirradiated damage tracks.

To achieve an increased solubility of the damage tracks by selective irradiation of the sheet surface with a high energy electron beam or electromagnetic radiation below 4,000A, the synthetic resin sheet must be disposed in an atmosphere containing at least some oxygen capable of reacting with the sheet. Air generally is preferred as the oxygen containing gas because of the ready availability of air although pure oxygen, or oxygen compound gases such as $N_2O$, $SO_3$, $SO_2$, and mixtures thereof, also may advantageously be employed dependent upon the form of charge particle bombardment selected.

Subsequent to the selective ultraviolet irradiation of sheet 10 in an oxygen atmosphere, the sheet is passed through an etchant suitable for the sheet composition, e.g., an aqueous or nonaqueous solution of acidic or basic catalysts or redox agents for a synthetic resin, to etch cylindrical apertures 24 less than 200A in diameter completely through the damage tracks located within the ultraviolet irradiated areas of the sheet, as shown in FIG. 2c. Etching however is terminated before damage tracks lying in areas of the sheet irradiated only by charge particles have completely etched through the sheet. Because the damage track etch rate is increased by a factor of approximately 10 to 1 by exposure to ultraviolet radiation, a plurality of pores 26 extending approximately one-tenth the thickness of sheet 10 are etched along areas of the sheet shielded during ultraviolet radiation.

Among the etchants suitable for synthetic resin sheets are sodium hydroxide, potassium hydroxide, lithium hydroxide, chromic acid, potassium permanganate, ammonium hydroxide, potassium t-butoxide, tetrapropyl ammonium hydroxide, and mixtures thereof. In general, a concentrated solution of the chosen etchant at a temperature in excess of 50° is preferred for rapid etching. The best results have been obtained with polycarbonate resin sheets utilizing a 6-normal solution of sodium hydroxide at about 80°C with stirring or agitation of the solution during etching.

The initial etching of sheet 10 is continued only for the period required to produce apertures completely through sheet 10 in the ultraviolet irradiated area of the sheet whereupon the sheet is rinsed in a neutralizer to rapidly terminate etching along damage tracks 28 lying outside the ultraviolet irradiated areas. Thus the sheet after the initial etch is characterized by preselected areas having cylindrical apertures less than 200A in diameter extending completely through the sheet in a density between $10^4$ and $10^8$ apertures per sq. cm. while areas of the sheet masked from ultraviolet radiation are pocked with $10^4 - 10^8$ pores per sq. cm. extending fractionally, e.g., less than one-third the sheet thickness, through the sheet. The selectively apertured sheet then is annealed at a temperature above 80°C to obliterate charge particle track damage remaining in the sheet, as portrayed in FIG. 2D. Although annealing has been known to obliterate charge particle track damage, annealing previously had been employed only prior to etching to control the size of the etched apertures.

After annealing sheet 10 to obliterate damage track existing therein, the selectively apertured sheet is passed into a second etching bath to enlarge apertures 24 from less than 200A in diameter to a diameter between 1,000A and 100,000A, as illustrated in the sheet depicted in FIG. 2E. To assure rapid passage of inks through the apertures, e.g., for screen printing purposes, the etch period generally is continued until apertures between 10,000A and 100,000A in diameter are formed over the ultraviolet irradiated portion of the sheet. The density of charge particle bombardment assures an aperture density between $10^4$ and $10^8$ apertures per cm. for high resolution purposes with no more than 10 percent of the sheet desirably being apertured to produce a tensile strength in the sheet sufficient to accept some mechanical working.

Desirably, the etching solution employed for enlarging apertures 24 is identical to the solution employed for the initial rapid etch of the sheet and either the selectively apertured sheet or the etching solution is agitated during the widening etch to assure a passage of the etching solution completely through apertures within the sheet. Because the surface of sheet 10 etches at a rate comparable to the etch rate of pores 26, the depth of the pores within the sheet does not significantly change during the aperture enlarging etch.

When the initial short term etching of sheet 10 is achieved by a solvent contacting both surfaces of the sheet, apertures formed in the sheet generally exhibit slightly inwardly tapering sidewalls with increased span from the surfaces of the sheet. Although subsequent enlargement of the apertures in accordance with this invention does not remove the angular taper of the sidewalls, the fluid flow characteristics of the enlarged apertures approach the flow characteristics of cylindrical apertures because of the enlarged fluid flow channel relative to the fixed taper of the channel sidewalls.

Sheets having a selective pattern of 1,000A to 100,000A diameter apertures in accordance with this invention suitably may be employed for screen printing by affixing the selectively apertured sheet 10 to the lower face of a rectangular frame 32 as illustrated in FIG. 4. A suitably colored ink, identified by reference numeral 34, of a viscosity suitable for the aperture diameter then is disposed within the rectangular frame atop apertured sheet 10 and the lower face of the sheet is contacted with an ink adhering material, e.g., paper sheet 36, whereupon squeegie 39 is longitudinally traversed across apertured sheet 10 to force a portion of ink 34 through those apertures extending entirely through the sheet and an image is reproduced which is the negative of shield 22 employed to selectively mask the sheet.

Polycarbonate sheets formed in accordance with this invention also can be employed for image projection purposes employing the projection system illustrated in FIG. 5 wherein a selectively apertured polycarbonate resin sheet 38 serves to selectively transmit collimated light rays from light source 40 to projection screen 42. In those areas of the sheet whereat a selective masking during ultraviolet radiation has inhibited the formation of through apertures, light rays from source 40 passes to screen 42 in a substantially unobstructed fashion. Light rays however impinging upon the apertured area 44 of the sheet are scattered in passing therethrough thereby reducing the intensity of light transmitted to the projection screen. Thus a positive image of the shield 22 employed during the selective ultraviolet radiation treatment of the sheet is formed upon projection screen 42.

When shield 22 has a nonuniform opacity to ultraviolet radiation along the length of the shield, a graded series of track lengths are formed in sheet 38 to produce a gray scale in the projected image. Similarly, although the light diffusing apertures in sheet 38 have been described in the preferred embodiment of FIG. 5 as extending entirely through the sheet, it should be realized that selective light ray scattering for image projection also can be obtained with synthetic resin sheets having only pores of diverse depth formed by the dual irradiation and etch technique of this invention.

To further enhance light transmission through areas of sheet 38 masked during ultraviolet irradiation of the sheet, a material having an optical density identical to the sheet, e.g., silicon oil, can be coated atop the sheet surface to fill any pores extending partially through the sheet. Oil adhering to the sidewalls of apertures extending entirely through the sheet then is removed by passing compressed air through the sheet. Similarly a liquid polycarbonate resin can be applied atop the selectively apertured sheet with air pressure atop the sheet being employed to blow clear apertures extending through the sheet. Upon hardening of the polycarbonate, a sheet is formed having 1,000A to 100,000A diameter apertures along a selected area with the remaining areas of the sheet being substantially free of pores 26.

What I claim as new and desire to secure by Letters Patent of the United States is:

1. A method of perforating a solid body in a predetermined pattern comprising subjecting said body to a homogeneous bombardment of charge particles having an energy level forming damage tracks extending through said body, exposing a selective portion of said homogeneously bombarded body in an oxygen containing ambient to radiant energy for a period required to alter the solubility rate of said exposed damage tracks, etching said body for a period sufficient to etch through those damage tracks lying within the selectively exposed portion of said body, said etch period being insufficient to etch through damage tracks lying outside said exposed portion of said body, annealing the selectively perforate body for a period required to obliterate the altered solubility of said damage tracks and etching said body to enlarge the perforations formed through said body during said initial etch of said body.

2. A method of perforating the body of a material selected from the group consisting of polymeric resins and celluostic materials in a predetermined pattern comprising subjecting said body to a homogeneous bombardment of alpha particles to form damage tracks which are more susceptible to etching by an etchant for said material than adjacent undamaged material, covering a portion of the surface of the body with a metallic shield to mask an area of the predetermined pattern against ultraviolet radiation, exposing the masked homogeneously bombarded body in air to ultraviolet radiation for a period equivalent to at least 15 minutes exposure with a 100-watt black light lamp disposed at a distance of 1 cm. from said material, etching said body in an etchant for said material for a period of time sufficient to etch through those damage tracks lying within that portion of the body uncovered by said shield, said etch period being insufficient to etch through damage tracks lying within that portion of the body covered by said shield, annealing the shielded portion of said perforate body for a sufficient period of time and at a temperature to effectively remove said damage tracks and to obliterate the altered solubility of the regions of said damage tracks, and further etching said body in an etchant therefor to enlarge the perforations formed through said body during said initial etch of said body.

3. A method of perforating a solid body of a material selected from the group consisting of synthetic resins annd cellulostic materials in a predetermined pattern comprising subjecting said body to a homogeneous bombardment of charged nuclear fragment particles having an energy level forming damage tracks which are more susceptible to etching by an etchant for said material than said undamaged material extending through said body, exposing a selective portion of said homogeneously bombarded body in an oxygen containing ambient to radiant energy selected from the group consisting of electromagnetic radiation having a wavelength shorter than 4,000 A.U. and high energy electrons for a period required to increase the solubility rate of said selectively exposed damage tracks, etching said body in an etchant for said material for a period sufficient to etch through those damage tracks lying within the selectively exposed portion of said body, said etch period being insufficient to etch through damage tracks lying outside said selectively exposed portion of said body, annealing the selectively perforate body for a sufficient period of time and at a temperature to effectively remove said damage tracks and to obliterate the altered solubility of the regions of said damage tracks and further etching said body in an etchant therefor to enlarge the perforations formed through said body during said initial etch of said body.

* * * * *